United States Patent [19]

Hosek et al.

[11] 4,426,958

[45] Jan. 24, 1984

[54] FLUIDIZED BED COMBUSTOR AND COAL GUN-TUBE ASSEMBLY THEREFOR

[75] Inventors: William S. Hosek, Mt. Tabor; Edward J. Garruto, Wayne, both of N.J.

[73] Assignee: Curtiss-Wright Corporation, Wood-Ridge, N.J.

[21] Appl. No.: 341,462

[22] Filed: Jan. 21, 1982

Related U.S. Application Data

[63] Continuation of Ser. No. 201,288, Oct. 27, 1980, abandoned.

[51] Int. Cl.³ .............................................. F28D 13/00
[52] U.S. Cl. ................................. 122/4 D; 110/263; 165/104.16
[58] Field of Search ............. 122/4 D; 110/263, 245; 34/57 A; 431/7, 170; 422/146; 432/58; 165/104.16

[56] References Cited

U.S. PATENT DOCUMENTS

| | | | |
|---|---|---|---|
| 3,861,862 | 1/1975 | Steever et al. | 432/58 |
| 3,983,927 | 10/1976 | Steever et al. | 122/4 D |
| 4,184,455 | 1/1980 | Talmud et al. | 122/4 D |
| 4,290,387 | 9/1981 | De Feo et al. | 122/4 D |
| 4,292,022 | 9/1981 | Hosek | 431/170 |
| 4,292,023 | 9/1981 | De Feo et al. | 431/170 |

*Primary Examiner*—Edward G. Favors
*Attorney, Agent, or Firm*—Stephen A. Roen; Arthur L. Frederick

[57] ABSTRACT

A coal supply gun assembly for a fluidized bed combustor which includes heat exchange elements extending above the bed's distributor plate assembly and in which the gun's nozzles are disposed relative to the heat exchange elements to only discharge granular coal material between adjacent heat exchange elements and in a path which is substantially equidistant from adjacent heat exchange elements.

9 Claims, 7 Drawing Figures

FLUIDIZED BED COMBUSTOR AND COAL GUN-TUBE ASSEMBLY THEREFOR

The Government has rights in this invention pursuant to Contract No. EX 76-C-01-1726 awarded by the U.S. Energy Research and Development Administration, now known as the Department of Energy.

This application is a continuation, of application Ser. No. 201,288, filed 10/27/80 abandoned.

BACKGROUND OF THE INVENTION

1. Field of the Invention

This invention relates, in general, to fluidized bed combustion and, in particular to a new and useful fluidized bed combustor which includes a coal supply gun assembly having a nozzle arranged to only discharge granular coal material between adjacent heat exchange elements of a heat exchanger assembly.

In the operation of a pressurized fluidized bed combustor where the fluidized bed is cooled by a cooling fluid which is circulated through heat exchange tubes of the heat exchanger assembly which extends up into the bed, it is not unusual that these tubes must be examined and/or replaced during the lifetime of such devices. The difficulty with the known construction is that even when the whole heat exchanger assembly, or any part thereof including its tubes, is easily removed through the bottom of the fluidized bed combustor's housing, a major shutdown of the combustor and a disassembly of a portion of the housing to facilitate removal and replacement and/or repair is still required and this is both costly and relatively time consuming.

SUMMARY OF THE INVENTION

In accordance with the present invention, there is provided a fluidized bed combustor comprising a housing defining an interior chamber having an upper and lower portion and a distributor plate assembly extending across the lower portion of the chamber including a plurality of tuyeres for the discharge of fluidizing air therethrough. A heat exchanger means which includes a plurality of heat exchange elements is adapted to extend above the distributor plate assembly and is mounted in the lower portion of the chamber. A fluidizing bed area extends from above the distributor plate assembly to the vicinity of an upper portion of the heat exchanger means and at least one coal supply gun assembly extends through the housing and terminates in the bed area. This coal supply gun assembly includes a plurality of discharge means arranged to only discharge granular coal material between adjacent heat exchange elements an in particular in a path which is substantially equidistant from adjacent heat exchange elements.

In the preferred embodiment, the coal supply gun assembly extends substantially vertically through the distributor plate assembly and more particularly through one of its tuyeres. In another embodiment, the coal supply gun assembly extends substantially horizontally through said housing.

Accordingly, it is an object of the invention to provide an improved fluidized bed combustor.

It is a further object of the present invention to provide a fluidized bed combustor in which its heat exchange elements have an increased useful life.

It is another object of the present invention to provide a pressurized fluidized bed combustor which has heat exchange elements that are significantly less susceptible to corrosion.

It is a still further object of the present invention to provide a pressurized fluidized bed combustor which has heat exchange elements which are less subject to heat distress.

Another object of the present invention is to provide a coal supply gun assembly for a fluidized bed combustor which includes heat exchange elements in which the nozzles of the coal supply gun assembly are disposed relative to the heat exchange elements in such a manner so as to obviate corrosion and decrease heat distress of the heat exchange elements.

Other objects of the invention will become apparent upon reading the specification taken in connection with the accompanying drawings.

GENERAL DESCRIPTION OF THE DRAWINGS

Figure 1:
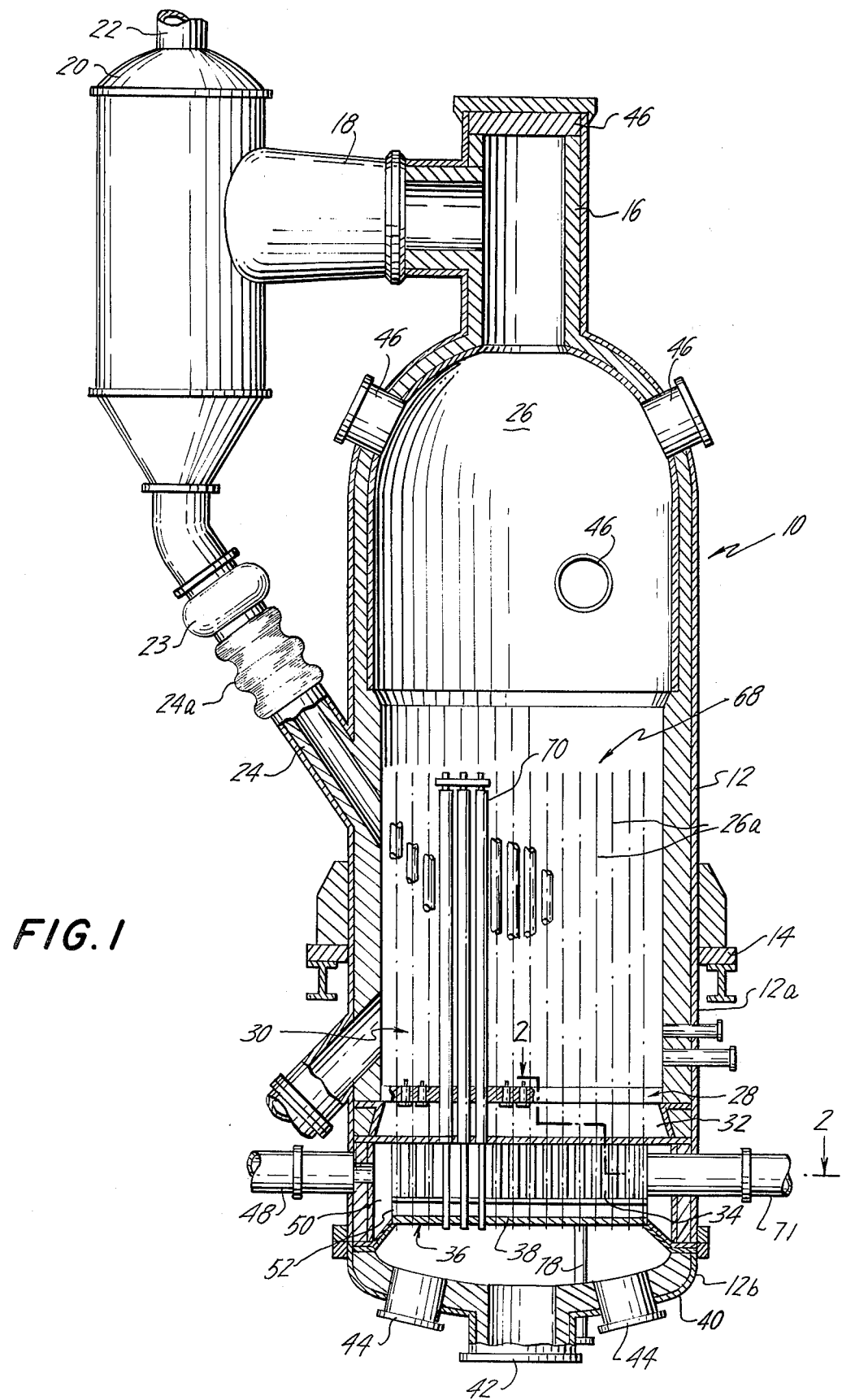
FIG. 1 is a simplified, partial vertical sectional view, partly in elevation, of a fluidized bed combustor construction in accordance with the invention.

Referring to the drawings, in particular, the invention embodied therein in FIG. 1 comprises a pressurized fluidized bed combustor generally designated 10 including a housing 12 having an upper portion 12a and a lower portion 12b which are bolted together and supported on four supports 14. The top of the combustor housing 12 includes a flue offtake 16 which connects laterally into a flue gas connection 18 to a separator 20. The separator 20 permits escape of cleaned gases through an exhaust 22 and solid particles are returned through a trickle valve 23 and return line 24 (having an expandable bellows section 24a) to the combustor 10 at the location of a fluidized bed portion or area 26a of a chamber 26. The fluidized bed area or reaction bed zone 26a is formed above a distributor plate assembly including distributor plate 28 of an assembly 30 which also includes a windbox 32, a heat exchanger inlet plenum chamber 34, a lower fluidizing air supply section 36 and a bottom support wall 38 which is spaced upwardly from a bottom housing wall 40 of housing 12. The bottom wall 40 has a main discharge 42 and a plurality of access openings or manholes 44. The upper portion 12a of the housing 12 also includes access openings or manholes 46.

Fluidizing air is supplied through a fluidizing air supply pipe 48 into an annular space 50 which surrounds the heat exchange inlet plenum 34 and the lower section 36. The fluidizing air flows into the lower section 36 through one or more inlets 52 which connect to the annular space 50 and air moves, as best seen by arrows 54 and 56 in FIG. 3, for passage upwardly through tubes 58 which extend through the heat exchange inlet plenum 34 for passage into the windbox 32 and for subsequent passage through a portion of the distributor plate assembly, individual tuyeres 60, which extend through the distributor plate 28 into the reaction bed zone 26a. The windbox 32 includes a bottom wall 62 spaced downwardly from the distributor plate 28 and a wall 64 is spaced downwardly from the wall 62 to define the heat exchanger inlet plenum 34 therebetween. Lower section 36 is bounded by the wall 64 on its top and a bottom support wall 38 on its bottom. The bottom wall 40 of the housing 12 is spaced below the lower section 36 and a heat exchanger fluid outlet chamber 66 is defined between the bottom housing wall 40 and bottom support wall 38. A cooling fluid or a heat exchanger fluid is directed through heat exchanger means generally designated 68 comprising one or more vertical, spaced parallel, heat exchanger elements or pipes 70, which engage into the heat exchange inlet plenum 34, and this fluid moves in heat exchange with the fluidized bed area 26a. This cooling fluid is directed into a plurality of conduits 71 which communicate with the interior of the heat exchanger inlet plenum 34.

Figure 3:
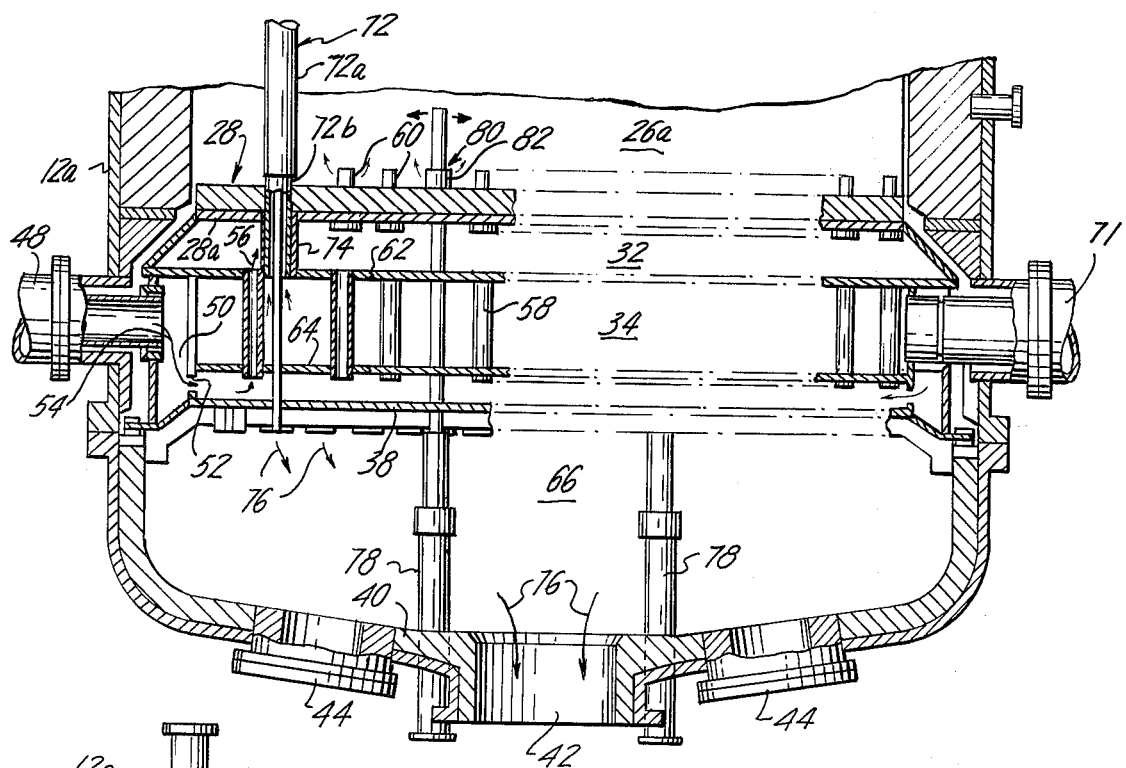
FIG. 3 is a simplified view similar to FIG. 1, but on an enlarged scale, primarily showing the lower portion of the combustor shown in FIG. 1.

Referring now particularly to FIG. 3, the fluid for use in the heat exchange with the fluidized bed 26a is passed between inner and outer pipes 72b and 72a of the heat exchanger pipes 72 which extend vertically upwardly in the fluidized bed area 26a above and substantially traversely to the distributor plate 28 and which has each of its outer tube portions 72a seated in tubular receiving socket 74 located between walls 62 and 28a. A lower support arrangement (not shown in detail) for the inner tubes 72b is provided at the location of the bottom support wall 38 of the assembly. A fluid which passes through the heat exchanger inlet plenum 34 passes upwardly between the inner and outer pipes of the heat exchange means or assembly 68 and flows upwardly in the space between the pipes and then return downwardly in the inner pipes 72b for discharge from the inner pipes 72b below the bottom support wall 38 and into the heat exchanger outlet plenum 66. Air which is thus discharged passes in the direction of arrows 76 and is discharged through the lower discharge opening 42 of housing 12. Such a heat exchanger pipe assembly 68 is described in more detail in a copending U.S. patent application of assignee's filed Aug. 1, 1979, Ser. No. 062,746, the relevant portions of which are incorporated by reference. Coal in granular form is direction by one or more coal guns 78 into the fluidized bed 26a.

Figure 2:
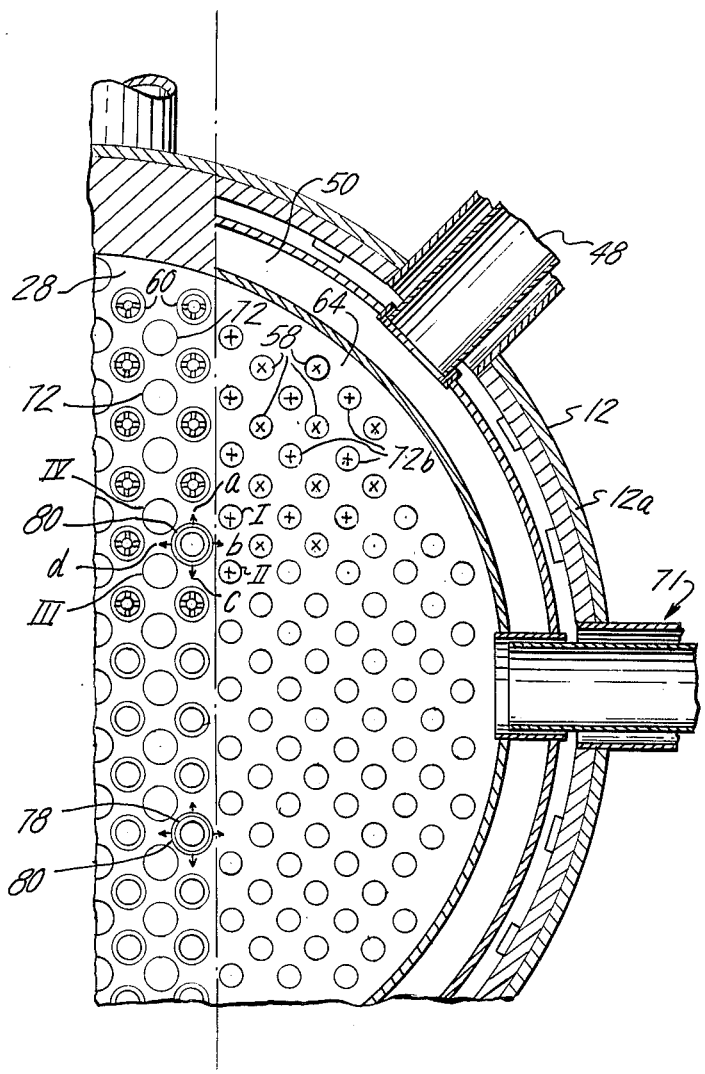
FIG. 2 is an enlarged, simplified, partial sectional view taken along the line 2—2 of FIG. 1.
Figure 4:
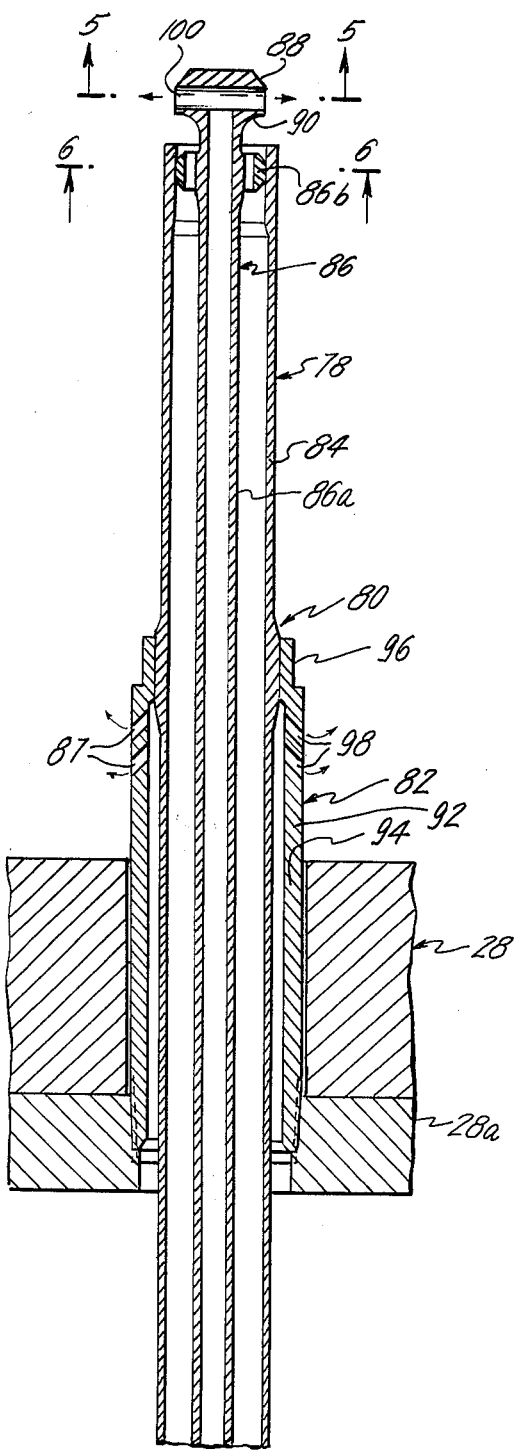
FIG. 4 is an enlarged sectional view of an upper portion of a coal supply gun assembly and its tuyere assembly for the combustor shown in FIG. 1.
Figure 5:
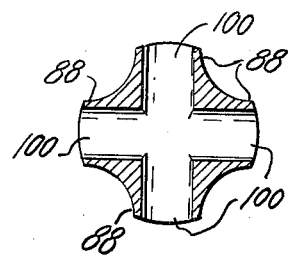
FIG. 5 is an enlarged sectional view of the nozzle of the coal supply gun assembly taken along the line 5—5 of FIG. 4.
Figure 6:
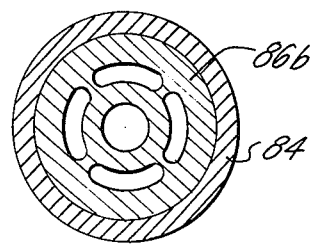
FIG. 6 is an enlarged sectional view of the end of the outer guide pipe, the support member and the coal supply pipe, taken along the line 6—6 of FIG. 4.

In accordance with the preferred embodiments of the invention, a coal supply gun-tuyere assembly, generally designated 80, comprises a combined coal supply gun and tuyere assemblies, 78 and 82, respectively, as shown in FIGS. 2 and 3, one of which is best shown in detail in FIGS. 4 through 6. Each coal supply gun assembly 78 includes a means for conveying coal vertically through pressurized fluidized bed combustor bottom housing wall 40, heat exchanger air outlet chamber 66 and through the lowest section 36, the heat exchanger inlet plenum 34 and the windbox 32 and its upper portion extends through the distributor plate 28 (through tuyere assembly 82) at a spaced location thereabove in the fluidized bed area 26a and above the separate tuyeres 60. The coal supply gun assembly 78 comprises an outer tube portion or guide tube 84 adapted to be mounted substantially vertically. An inner tube 86, located within the outer guide tube 84 defines a coal gun supply pipe 86a between which an integral annular support member 86b is disposed having four equally spaced slots therein permitting cooling air to flow therethrough to cool nozzles 88 disposed thereabove. The upper portion of the coal supply gun assemblies' supply pipe 86a has a top portion 90 which includes two pairs of said nozzles 88 arranged to discharge granular coal material in four different directions and is described in more detail infra. The lower portion of the coal supply gun assembly 78, which extends below the distributor plate 28, is described in more detail in another copending U.S. patent application of assignee's filed Aug. 1, 1979, Ser. No. 062,745, the relevant portions of which are incorporated by reference. Each of the upper portions of the coal supply gun assemblies 78 extends through an enlarged tuyere assembly 82 which comprise a sleeve means 92 including a spaced apart lower cylindrically shaped portion 94 which generally surrounds the outer guide pipe 84 and a narrower, upper portion 96 which seals the top end of said sleeve 92 against the outer wall of the outer guide pipe 84. Sleeve means 92 is conventionally mounted within an aperture in the distributor plate 28 and defines, with the outer wall of outer pipe 84, an annular opening which communicates, at its lower end, with the windbox 32, and at its upper end, with a plurality of downwardly extending air passages 98, which are arranged in four pairs disposed at right angles to each other so that fluidizing air is discharged into the fluidizing bed area 26a at four equally, angularly spaced locations.

The two pair of nozzles 88 of the coal supply gun assembly supply pipe 86a are arranged to discharge granular coal material in four directions, through four horizontally oriented passageways 100, each passageway 100 being disposed at right angles to each other. Furthermore, as best shown in FIG. 2, the coal supply gun assemblies 78 are disposed equidistant from the closest adjacent four heat exchange elements 72 and their nozzles 88 are arranged to only discharge the granular coal material between adjacent heat exchange elements 72 and in a path which is substantially equidistant from and traverse to adjacent, vertically oriented, heat exchange elements 72 which lie on opposite sides of said path. As a result of such plurality of discharge means 88, four nozzles in this embodiment, which are arranged to only discharge the granular coal material from the coal supply gun pipe 86a between adjacent heat exchange elements 72, and more specifically in the case of the upper coal supply gun assembly 78, the coal is discharged in four directions, in paths a, b, c and d, between adjacent pairs of heat exchange elements IV and I, I and II, II and III, III and IV, and IV and I, respectively, there is achieved not only a more effective distribution of the coal in the fluidized bed contact zone 26a which reduces the extent of carbonizing atmosphere at the heat exchange element's 72 surface walls thereby eliminating corrosion thereof but heat distress thereof also is decreased. Such heat distress or torching precludes the formation of deleterious hot spots forming on these adjacent heat exchange elements 72 whereby their useful life is increased among other advantages resulting thereby.

Figure 7:
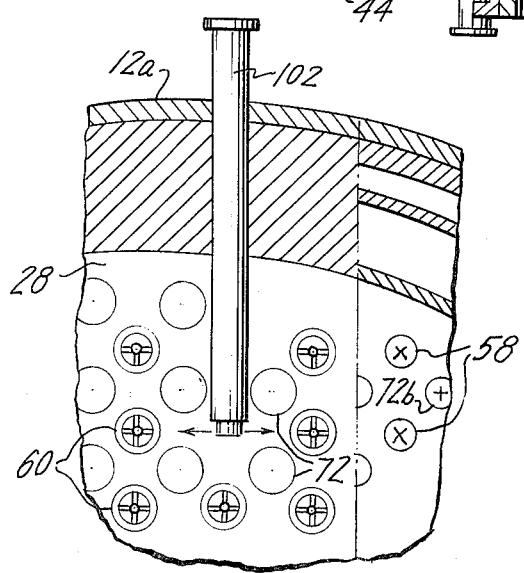
FIG. 7 is a simplified view similar to FIG. 2 showing another embodiment of a combustor utilizing a horizontal coal supply gun assembly.

In another embodiment, as shown in FIG. 7, a plurality of horizontally oriented coal supply gun assemblies 102, only one of which is shown, are disposed above the distributor plate assembly including distributor plate 28 and individual tuyeres 60, and extend into the reaction bed 26a. Each coal supply gun assembly 102 comprises an outer tube portion and an inner tube portion of the same type as shown in FIGS. 1-6, and extend through and is mounted in a side wall of the upper portion 12a of housing 12. Horizontal coal supply gun assembly 102 utilizes a single pair of nozzles arranged to horizontally discharge the granular coal material in two opposite directions through two passageways therein between heat exchange elements 72 and in a path which is substantially equidistant from and traverse to adjacent, vertically oriented, heat exchange elements 72 which lie on opposite sides of said path. Similar advantages to those achieved by the embodiment shown in FIGS. 1-6 are achieved in this embodiment including the elimination of corrosion and the decrease of heat distress to the adjacent heat exchange elements 72.

It should be understood that this invention is not limited to the specific details of construction and arrangement thereof herein illustrated and that changes and modifications may occur to one skilled in the art without departing from the scope of the invention.

What is claimed is:

1. A fluidized bed combustor comprising
   a housing defining an interior chamber having an upper and lower portion, said upper portion having a top portion for the discharge of combustion gases and said lower portion having a bottom portion with an outlet for cooling fluid,
   a distributor plate assembly extending across the lower portion of said chamber including a plurality of tuyeres for the discharge of fluidizing air therethrough,
   means defining a windbox below said distributor plate assembly communicating with said tuyeres,
   means defining a heat exchanger inlet plenum below said windbox including a plurality of tubes extending therethrough for the passage of air to said windbox,
   means defining a lower section below said heat exchanger inlet plenum with a connection to an air supply means for supplying air through said plurality of tubes to said windbox,
   heat exchanger means adapted to extend above said distributor plate assembly and being mounted in said lower portion of said chamber, said heat exchanger means including a plurality of heat exchange elements,
   means defining a fluidizing bed area extending from above the distributor plate assembly to the vicinity of the upper portion of said heat exchanger means, and at least one coal supply gun assembly extending through said housing and terminating in said chamber above said distributor plate assembly, and said at least one coal supply gun assembly comprising a plurality of discharge means arranged to only discharge the granular coal material between adjacent heat exchange elements.

2. The combustor according to claim 1 wherein said distributor plate assembly includes a plurality of tuyeres and wherein said at least one coal supply gun assembly extends substantially vertically through at least one of said tuyeres of said distributor plate assembly.

3. The combustor according to claim 1 wherein said distributor means are arranged to only discharge the granular coal material in a path which is substantially equidistant from adjacent heat exchange elements.

4. The combustor according to claim 1 wherein said heat exchange means comprises spaced parallel heat exchange elements.

5. The combustor according to claim 4 wherein said distributor plate assembly includes a distributor and wherein said heat exchange elements extend substantially traversely to said distributor plate.

6. The combustor according to claim 1 said fluidized bed combustor further includes means defining a fluidized bed area extending from above the distributor plate assembly to the vicinity of the upper portion of said heat exchanger means, and wherein each of said discharge means comprises a nozzle arranged to discharge said coal into the fluidized bed area transversely to the heat exchange elements.

7. The combustor according to claim 3 wherein said plurality of discharge means comprises at least one pair of nozzles arranged to discharge the granular coal material in opposite directions.

8. The combustor according to claim 7 wherein said plurality of discharge means includes two pairs of nozzles each pair of nozzles arranged to discharge the coal in a path transversely to the other pair of nozzles' discharge path.

9. The combustor according to claim 2 wherein said fluidized bed combustor further includes means defining a fluidizing bed area extending from above the distributor plate assembly to the vicinity of the upper portion of said heat exchanger means, and wherein said at least one coal gun assembly comprises an outer guide pipe having one end adapted to terminate in the fluidized bed area, a coal supply pipe disposed within said outer guide pipe, means for directing air into the space between said coal supply pipe and said outer guide pipe for discharge in the fluidized bed area, and wherein said at least one of said tuyeres comprises a sleeve means including a lower portion surrounding and spaced apart from said outer guide pipe and an upper portion which seals against said outer guide pipe.

* * * * *